May 26, 1970   W. O. ARNOLD, JR   3,514,526
SEGMENTED INSULATED WIRING BOX
Filed June 5, 1968   2 Sheets-Sheet 1
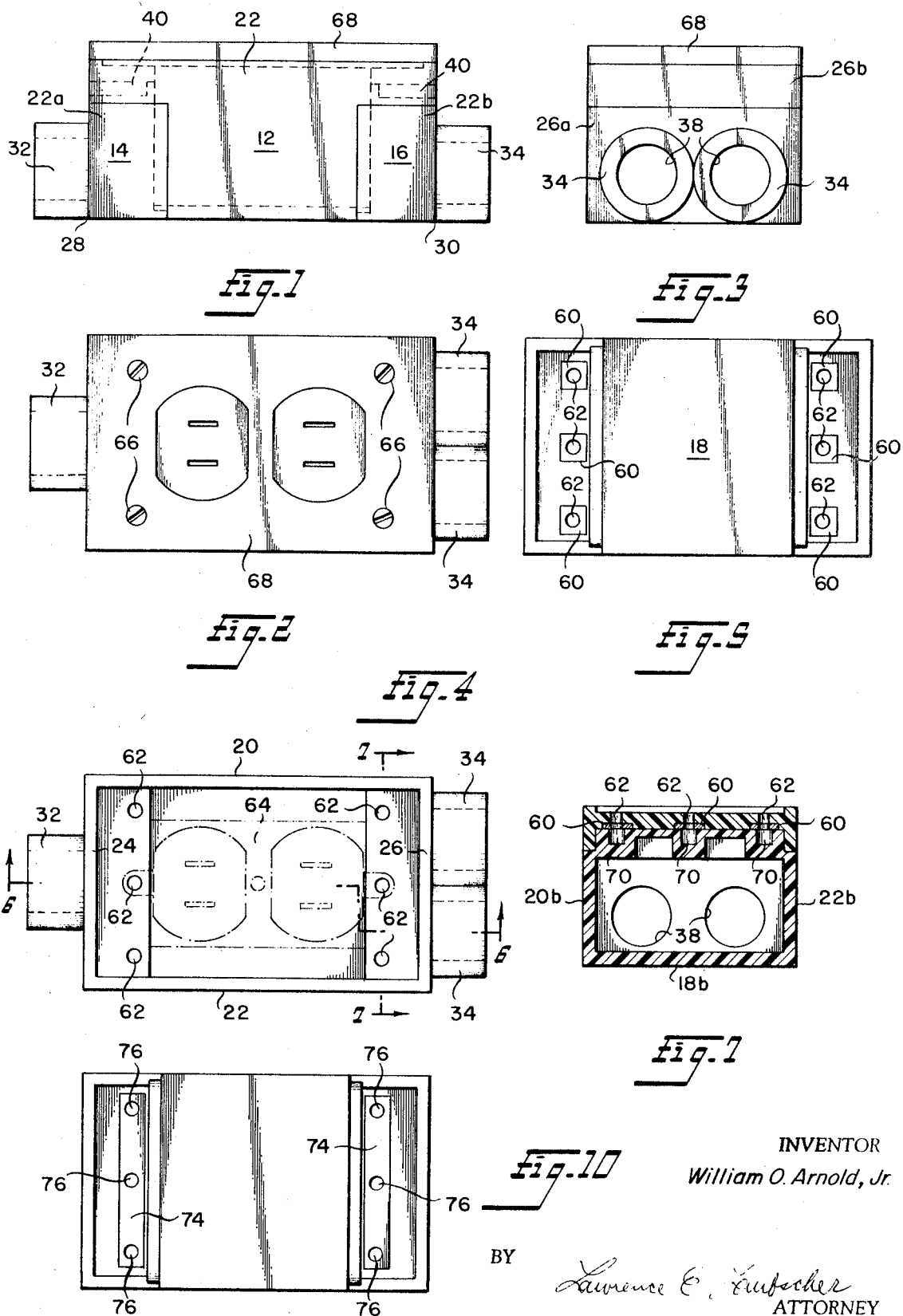
INVENTOR
William O. Arnold, Jr.
BY
Lawrence E. Laubscher
ATTORNEY May 26, 1970     W. O. ARNOLD, JR     3,514,526

SEGMENTED INSULATED WIRING BOX

Filed June 5, 1968     2 Sheets-Sheet 2

INVENTOR
William O. Arnold, Jr.

BY Lawrence E. Faubacher
ATTORNEY

United States Patent Office 3,514,526
Patented May 26, 1970

---

3,514,526
SEGMENTED INSULATED WIRING BOX
William O. Arnold, Jr., Parkersburg, W. Va., assignor to Union Insulating Company, Inc., Parkersburg, W. Va., a corporation of West Virginia
Filed June 5, 1968, Ser. No. 734,653
Int. Cl. H02g 3/08
U.S. Cl. 174—53          8 Claims

ABSTRACT OF THE DISCLOSURE

A sectional molded insulation electrical wiring box including a central body section and interchangeable end sections each containing access openings of a selected size. By the selection of desired end sections for use with a common central body section, large numbers of electrical box configurations are obtainable in an inexpensive manner with a minimum amount of inventory.

---

Figure 6:
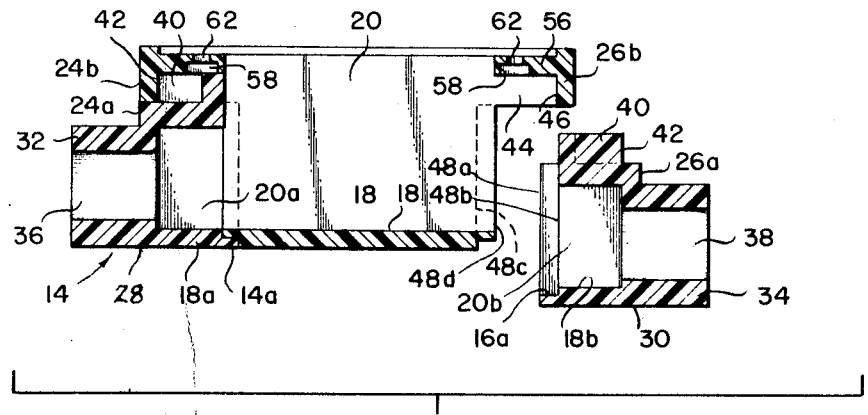

As evidenced by the prior Palmer Pat. No. 3,168,613, it has been proposed in the patented prior art to provide sectional electrical wiring boxes that are formed by molding from a suitable insulating material, such as a phenol resin, polyvinyl chloride or the like. The electrical box is centrally divided to define a pair of end sections connected by a joint including corresponding mating surfaces that are rigidly bonded together by a suitable strong adhesive. By assembling different types of end sections having various numbers and sizes of cable access openings, a large variety of boxes may be produced that meet many different wiring requirements. For example, a box may be constructed having at one end a plurality of entrance bosses of one given size, and at the other end, a single boss of a larger given size in accordance with the given installation requirements.

In order to strengthen and improve the structural joint between the sections, it has been proposed, in accordance with the instant invention, to provide integral abutting shoulder surfaces between the components for resisting the longitudinal stresses applied to the box, thereby preventing longitudinal separation of the components. Furthermore, by providing a central body section module adapted for connection with any one of a large number of interchangeable end sections, the versatility of box design is enhanced through the use of smaller sized components, whereby the inventory storage space is materially reduced.

Accordingly, the primary object of the present invention is to provide a sectional molded insulation wiring box including central box section and at least one interchangeable end section connected with said body section. Cooperating transverse integral shoulder surfaces are provided between the sections for preventing longitudinal separation of the components, whereby an assembly having high tensile strength is presented.

According to a more specific object of the invention, each interchangeable end section carries the entire edge between the bottom and corresponding end wall, whereby longitudinally extending flange surfaces are arranged for abutment on the side and bottom walls of the end and body section, thus affording relatively large surface areas for strengthened bonding of the components.

In accordance with another object of the invention, one of the transverse shoulder surfaces preventing separation of the components is carried by a transverse projection on one section that extends into a corresponding recess contained in the other section. The abutting cooperation between the end surfaces of the projection and recess are used to retain mounting nut means in corresponding indentations, whereby improved, strengthened connection of the cover component and the electrical device to the box is obtained.

Figure 8:
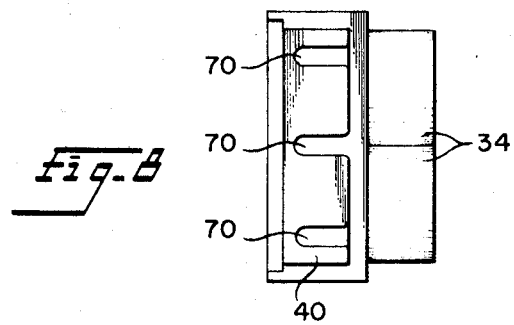
Figure 9:
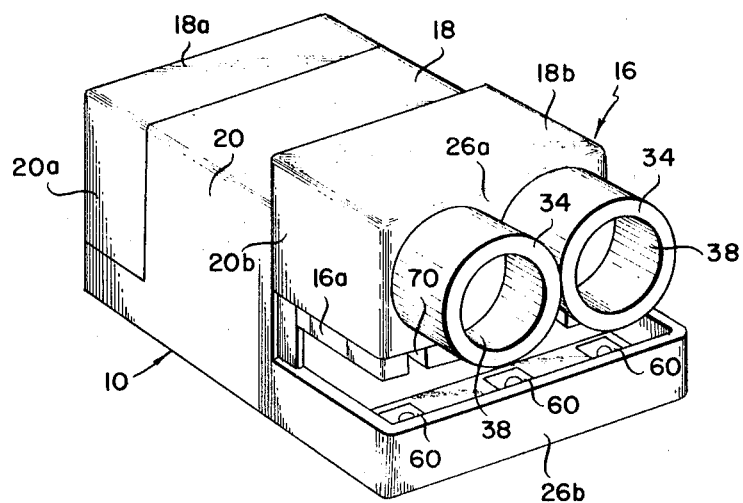

Other objects and advantages of the invention will become apparent from a study of the following specification when viewed in the light of the accompanying drawing, in which:

FIG. 1 is a side elevational view of the fully assembled molded insulation wiring box of the present invention;
FIGS. 2 and 3 are top and end views of the box of FIG. 1;
FIG. 4 is a top view of the box of FIGS. 1–3 with the cover plate removed;
FIG. 5 is a bottom view of the central body section of the box, the end sections being removed;
FIG. 6 is a partially exploded sectional view taken along line 6—6 of FIG. 4;
FIG. 7 is a sectional view taken along line 7—7 of FIG. 4;
FIG. 8 is a top plan view of an end section;
FIG. 9 is a partially exploded bottom perspective view of the box of FIG. 1; and
FIG. 10 is a bottom view of a second embodiment of the central body section, the end sections being removed.

Referring to the drawing, the sectional electrical wiring box 10 is molded from suitable insulating material, such as a phenol resin, polyvinyl chloride or the like, and includes a central body section 12 the ends of which contain openings for receiving interchangeable end sections 14 and 16. The sections, when assembled, define a box including a bottom wall 18, a pair of side walls 20 and 22, and a pair of end walls 24 and 26. The end section 14 carries one entire bottom edge 28 of the box and the adjacent end, bottom and side wall portions 24a, 18a, 20a and 22a, respectively. The end section 16 carries the entire bottom edge 30 and the adjacent end, bottom and side wall portions 26a, 18b, 20b and 22b, respectively. Each interchangeable end section carries at least one boss 32, 34 containing a through passage 36, 38 of a given size, respectively, affording access to the interior of the electrical box.

In accordance with the present invention, improved means are provided for rigidly securing the end sections to the central body section. More particularly, the end sections include upwardly extending shoulders 40 having outwardly directed surfaces 42 parallel with the end walls, said shoulders being adapted to extend within corresponding recesses 44 contained in the lower surfaces of the upper end wall portions 24b and 26b. The outwardly directed surfaces 42 are arranged to abut corresponding inwardly directed surfaces 46 defined by the recess walls, whereby longitudinal outward movement of the end sections relative to the central body section is prevented.

In order to further connect the end and central body sections, each of the end sections includes on its side and bottom walls inwardly directed longitudinally extending flange portions 14a, 16a that extend into corresponding recesses contained in the body section, as generally proposed in the prior Palmer Pat. No. 3,168,613. The corresponding abutting surfaces, inwardly and outwardly directed surfaces (48a, 48b and 48c, 48d, respectively), and the adjacent longitudinal wall surfaces defined by the flange portions are secured by a suitable adhesive that is appropriate for use with the specific synthetic plastic material of the box. If desired, the adhesive may be used also to bond together the companion abutting surfaces on the shoulder means and the central body member.

Referring to FIGS. 5 and 6, the top recess walls 56 contain indentations 58 for receiving nuts 60, the threaded bores of the nuts being in communication with downwardly extending passages 62 in the central body member. As shown in FIG. 4, the central nuts are used to secure in the box cavity a desired electrical device 64, such as a wall outlet receptacle, a switch or the like. The outer two nuts at each end are adapted to receive screws 66 by means of which the cover 68 is fastened in place as shown in FIGS. 1 and 2. The nuts 60 are positively maintained in the indentations by the upper surface of the projections 40, which projections contains grooves 70 arranged beneath the nuts as shown in FIGS. 7 and 8.

In place of a plurality of nuts arranged in separate indentations, respectively, mounting plates 74 may be provided as shown in the embodiment of FIG. 10, each of said mounting plates containing a plurality of threaded bores 76 for receiving the screw fastener means by which the electrical device and the cover are secured to the box.

It is apparent that other modifications may be made in the apparatus described. For example, the projection means may be provided on the central body member for projection into a corresponding recess contained in the end section. Alternatively, the cooperating shoulder means might be arranged on the side and/or bottom wall portions of the end wall sections for engagement with corresponding abutting surfaces on the central body section. The box could be made with both ends blank, or with an opening in one end and the other end blank. The end sections need not necessarily be formed from the same material as the center section. While the adhesively secured surfaces on the end sections have been illustrated as being inwardly directed relative to the corresponding outwardly directed surfaces on the central section, it is obvious that these surfaces could be reversed, if desired. Other modifications may be made in the apparatus described without deviating from the invention set forth in the following claims.

What is claimed is:
1. In a sectional electrical wiring box the sections of which are molded from synthetic plastic insulating material and are adapted for assembly to define a horizontal bottom wall and vertical side and end walls, the improvement which comprises
 a body section carrying at least portions of said bottom, side and end walls, at least one bottom edge of said body section between said bottom wall and a first one of said end walls containing an opening;
 an end section mounted in said bottom edge opening and carrying at least portions of the corresponding bottom and end walls, respectively, said end section containing at least one access passage of a given size affording access to the interior of said box;
 and abutment means connecting said end section with said body section to prevent longitudinal movement of said end section relative to said body section, comprising outwardly and inwardly directed abutment surfaces carried by said end section for cooperation with corresponding inwardly and outwardly directed abutment surfaces carried by said body section, respectively, said abutment surfaces being generally parallel with said first end wall.

2. A wiring box as defined in claim 1, wherein said end section carries the entire edge between said bottom wall and said end wall, and the adjacent corner portions of said bottom, side and end walls.

3. A wiring box as defined in claim 2, wherein said body and end sections include corresponding contiguous surfaces parallel with said side walls, and further including adhesive means bonding together said corresponding contiguous surfaces.

4. A wiring box as defined in claim 2, wherein said body and end sections include corresponding abutting surfaces parallel with said bottom wall, and further including adhesive means bonding together said corresponding abutting surfaces.

5. A wiring box as defined in claim 2, wherein said body and end sections include first corresponding abutting surfaces parallel with said bottom wall and second corresponding abutting surfaces parallel with said side walls, and further including adhesive means bonding together said corresponding abutting surfaces.

6. A wiring box as defined in claim 1, wherein said body section carries the upper portion of said first end wall, said upper end wall portion having a horizontal lower surface containing an upwardly extending recess; and further wherein said abutment means includes shoulder means on said end section extending upwardly within said recess.

7. A wiring box as defined in claim 6, wherein the upper surface of said recess is horizontal and contains at least one indentation;
 and mounting nut means arranged in said indentation and containing at least one threaded bore, said body section containing a downwardly extending communication with said bore;
 said end section shoulder means having a horizontal upper surface adapted to cooperate with the recess upper surface to retain said mounting nut means in said indentation.

8. A wiring box as defined in claim 7, wherein said mounting nut means comprises a plate containing a plurality of spaced threaded bores.

References Cited
UNITED STATES PATENTS 3,168,613  2/1965  Palmer _____ 174—65

FOREIGN PATENTS 815,657  10/1951  Germany.

LARAMIE E. ASKIN, Primary Examiner

D. A. TONE, Assistant Examiner

U.S. Cl. X.R.

220—3.94